(12) United States Patent
Pontius (10) Patent No.: US 7,240,048 B2
(45) Date of Patent: Jul. 3, 2007

(54) SYSTEM AND METHOD OF PARALLEL PATTERN MATCHING

(76) Inventor: Ben Pontius, 8407 16th St., Apt. 311, Silver Spring, MD (US) 20920

( * ) Notice: Subject to any disclaimer, the term of this patent is extended or adjusted under 35 U.S.C. 154(b) by 33 days.

(21) Appl. No.: 10/519,695

(22) PCT Filed: Aug. 1, 2003

(86) PCT No.: PCT/US03/25271

§ 371 (c)(1),
(2), (4) Date: Dec. 27, 2004

(87) PCT Pub. No.: WO2004/013777

PCT Pub. Date: Feb. 12, 2004

(65) Prior Publication Data

US 2005/0251509 A1    Nov. 10, 2005

Related U.S. Application Data

(60) Provisional application No. 60/401,457, filed on Aug. 5, 2002.

(51) Int. Cl.
*G06F 17/30* (2006.01)
*G06F 15/16* (2006.01)
(52) U.S. Cl. .................. 707/3; 707/1; 707/4; 709/217
(58) Field of Classification Search ............... None
See application file for complete search history.

(56) References Cited

U.S. PATENT DOCUMENTS

5,455,932 A  10/1995  Major et al.
5,606,690 A   2/1997  Hunter et al.

*Primary Examiner*—Jeffrey Gaffin
*Assistant Examiner*—Hassan "Tony" Mahmoudi
(74) *Attorney, Agent, or Firm*—Rutan & Tucker, LLP (57) ABSTRACT

The present invention provides systems and methods for creating a finite state automata (FSA) (FIG. 1, blocks 110–180) that matches patterns in parallel including the steps of creating states of the automata from a set of patterns to be matched (FIG. 2, blocks 210–280) and passing over the patterns a second time adding transitions to the states to match all the possible that can start within the pattern (FIG. 3, blocks 0–7).

12 Claims, 4 Drawing Sheets

SYSTEM AND METHOD OF PARALLEL PATTERN MATCHING

This application claims the benefit of U.S. provisional application No. 60/401,457 filed on Aug. 5, 2002 incorporated herein by reference in its entirety.

FIELD OF THE INVENTION

The field of the invention is electronic file searching.

BACKGROUND OF THE INVENTION

Pattern matching may be defined as an activity which involves searching or scanning any type of data which can be stored or transmitted in digital format. A common type of pattern matching is searching for text in a file. Construction of a "machine" for pattern matching can be relatively intuitive. For example, given the pattern, "abc", we would look at every character in the file, initially expecting an 'a'. If found, we would then examine the next character, expecting a 'b'. If a 'b' was found, we would then expect a 'c'. If, at any point, we do not find what we expect, we return to the expectation of an 'a'.

We have just begun to describe a finite state automaton— which generally comprises the following five components:
1. a finite alphabet (e.g. the ascii characters);
2. a finite set of patterns (e.g. "abc", . . . );
3. a finite set of states (e.g. one for each of 'a', 'b', and 'c'.); For each pattern, we may also define a final ("accepting") state, which we enter upon having matched that pattern (e.g. "abc");
4. one designated initial state; and
5. a move function that defines how the automaton changes state as it processes an input stream (described above.)

Parallelism in Pattern Matching

The notion of parallelism in pattern matching has to do with subpatterns, in particular, subpatterns of the type in which one or more consecutive elements, starting with the first element, occur (in sequence) in a second pattern. There are typically two ways in which this can manifest:

Case 1. The first N elements of Pattern1 are also the first N elements of pattern2,
(N>=1). For example, "air", "airplane".
Case 2. The subpattern consisting of the first N elements of pattern1 appears in
pattern2, but does not include the first element of pattern2. For example, "eel" and "feeler".

Finite state automata (fsa or state machines) are typically represented as directed graphs (also called state transition diagrams). This type of diagram preferably has a root node, which represents the initial state, and edges (or transitions) connecting the nodes, and labeled with the input which will trigger each transition.

An existing pattern matching algorithm is that developed by Aho & Corasik and later improved upon by Commentz-Walter. The Commentz-Walter method is commonly known as fgrep. Fgrep uses hashing to skip over areas in the text where no matches are possible. All commonly implemented methods of pattern matching use either the original Aho & Corasik implementation of the finite state automaton or the fgrep method of partial FSA implementation.

There is a need, however, to simplify the FSA, making it so fast that it is as good as hashing or other skipping methods in the regions without matches, yet faster than Aho & Corasik where matches are found.

SUMMARY OF THE INVENTION

The present invention provides systems and methods for creating a finite state automata (FSA) that matches patterns in parallel including the steps of creating states of the automata from a set of patterns to be matched and passing over the patterns a second time adding transitions to the states to match all the possible patterns that can start within the pattern.

Another aspect is directed toward a FSA that uses array-based transitions. The system includes an alphabet of size N in which each state is represented by an object containing an array of N pointers to possible successive states and wherein the numeric value of each member of the alphabet is then used as an offset into the array to point to the next state for the input.

Yet a further aspect is directed toward creating a case-insensitive FSA by making each pattern all one case and after having created the FSA, adding corresponding transitions on each alphabetic character so that the case of characters in the input stream will have no effect on the performance of the FSA.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
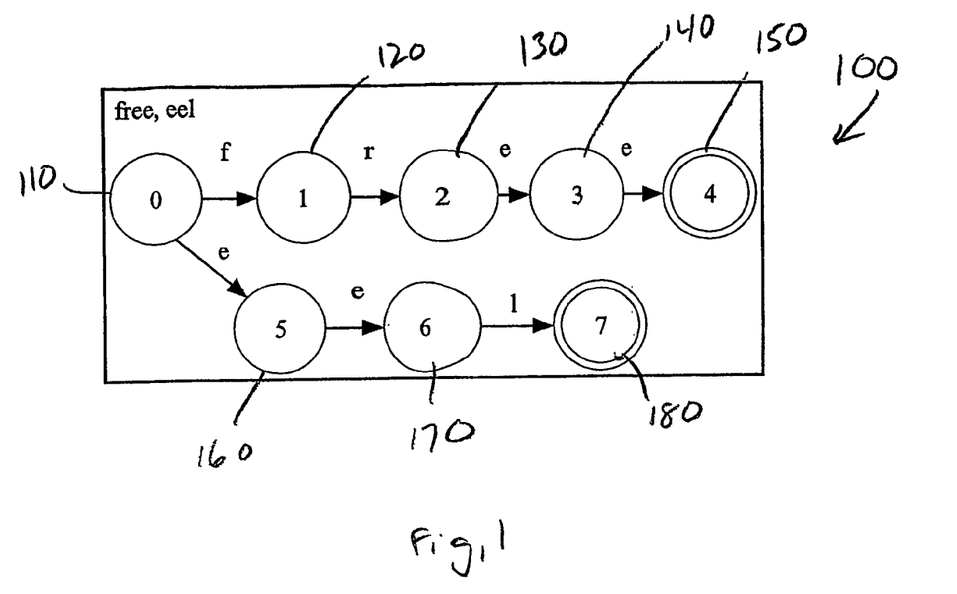
FIG. 1 is a FSA shown as a directed graph.

Referring first to FIG. 1, a state transition diagram 100 for a partially constructed FSA for matching "free" and "eel" is generally comprised of circles 110–180 which represent the states of the machine, with the double circles (150 and 180) representing final (or accepting) states. Implicit in these diagrams is that, for any state, for any input other than those shown, there is a transition to the initial state.

The arrows between the circles represent the transitions or edges, and, in this document the numbers in the circles simply represent the order of creation. Since a state can have at most one transition for a given input, the set of all possible transitions of a particular FSA can be described as a set of ordered pairs of the type{input, state}.

Definitions

For the Remainder of this Document, we will use the Following Conventions:
∃ is equivalent to "there exists".
| is equivalent to "such that".
∋ is equivalent to "element of".
The '.' operator is used to indicate an attribute (data or function) of an object.
$a_i$ means "the ith element of A". e.g. "∃ $t(a_i, s')|t(a_i, s')$ ∋s.T" means, "there exists a $t(a_i,s)$ such that t $(a_i, s)$ is a member of s.T".
⇐is the assignment operator, meaning "becomes".
= is the equivalence operator.
null represents the empty state (or "no state").
Ellipsis " . . . " indicate zero or more unspecified parameters.

Exemplary pseudocode is one-based, i.e. "for i⇐1 until length (p)" means for each i starting with the first element up to the length of p. (This convention differs from languages such as C++, C, and Java, which are all zero based).
F denotes FSA.
S denotes the set of all states in machine.
s0 is a special identifier for the initial state of machine, which is equivalent to $s_o$.
Σ denotes the alphabet i.e. the finite set of all possible inputs to machine.
We define a transition t (a, s), as an ordered pair|a ∋Σ and s ∋S.
Each sate s of S has a (possibly empty) set of transitions, denoted by "s.T".
Note that the action of any machine, upon matching a pattern will be application-specific. e.g. A text search engine might simply list the number of occurrences of each pattern. A virus detection engine might create another thread or process to quarantine or remove the file being searched, etc. We will, therefore only refer to two unspecified functions, setAction() and doAction(), which are simply placeholders for specific functions which define and invoke the action to be taken.

The move() function may be defined as a member of the class state. For any input a in A, if s is the current state, we call s.move(a) to determine the next state:

```
function move (aᵢ)
begin
    if ∃ t(aᵢ, s') | t(aᵢ, s') ∋T
        return s';
    else
        return null;
    endif
end
```

Array-Based Implementation

For alphabets of up to 256 elements, we may implement each state's set of transitions as an array (a fixed block of contiguous memory) of length the size of the alphabet. (128 for ascii, 256 for binary searches). This array may contain pointers to states, and initially will typically contain all zeros (null pointers) if we are building a non-deterministic FSA. (When building a deterministic FSA, we will create the initial state first, and initialize its array, and the arrays of all subsequently created states to the address of the initial state). This strategy allows us the fastest possible state lookup, simply using the numeric value of the input character as an offset into the current state's array to determine the next state.

The following two examples depict the implementation of our array based approach to transitions:

```
function move (aᵢ)              function move (aᵢ)
begin                           begin
    return Array [aᵢ & 127];        return Array [aᵢ];
end                             end
7 bit (ascii) move ( )          8 - bit (binary) move ( )
```

We define a second member function of state, addTransition(), as follows: Using our system, one has the option of creating a non-deterministic FSA and then converting it to a deterministic FSA, if so desired, or simply building a deterministic FSA from the beginning. In the following pseudocode, there will be minor differences, depending upon which type of FSA we are building. We use the following conventions to indicate which type we are creating:

Text in italics is specific to non-deterministic FSA only.
Underlined Text Indicates Pseudocode Specific to Deterministic FSA Only.

Where there is a pair of lines of the above format, one would be used, depending upon the type of FSA.

```
function addTransition (a, s2)
begin
    if Array [a] = null
    if Array [a] = s0
        Array [a] ⇐s2;
    endif
end
```

Note: addTransition() ensures that there can be only one transition from state s on input a. Once entered that transition will not change.

Constructing the Machine
  1. Creating the Graph
  We may now define the following functions for building our FSA from a set of patterns, P. Generally, we first define a function, CreateGraph, which, for each pattern, P, in our set of patterns, calls the following function, createGraph (P).

```
function createGraph (p)
begin
    if s0 = null
        s0 ⇐new state;
    endif
    state currentState ⇐s0;
    state nextState ⇐null;
    for i ⇐1 until length (p)
        nextState ⇐currentState.move (pᵢ);
        if nextState = s0
        if nextState = null
            nextState ⇐new state;
            currentState.addTransition (pᵢ, nextState);
        endif
        currentState ⇐nextState;
    endfor
    currentState.setAction(...);
end
```

2. Completing the Graph
  If we consider the two necessary and sufficient conditions for a pattern matching FSA, we will find that having called CreateGraph, we have created an FSA which will satisfy case 1, above. We will see that we have already created enough states to satisfy both case1 and case 2, above. All that remains is to add any missing transitions. That is to say, whenever a pattern (or any first portion of a pattern) appears as a subpattern of another, we add the appropriate transitions to the states that match the containing pattern so that the subpattern will not be missed. Since the patterns to be matched, in combination with the transitions of the initial state, typically contain all the information needed to determine any necessary additional transitions, the most direct approach to completing graph is to pass each pattern through our partially constructed machine as follows:
  We define a second function, Complete Graph(), which, in turn calls completeGraph (P) for each of patterns. In completeGraph, we make a second pass over P, starting with its transition out of the initial state to the next state, which expects $p_2$, the second element of P. We then move to the second state, as dictated by $p_2$. At this point we check for a transition out of state 0 on element $p_2$. If found, we add all transitions in that state to our current state, and enqueue that state to be examined in the next iteration. We also check each of the previous states in our queue, if any, to see if there is a move from that state on $p_2$. If so, we add the edges from the state moved to, and enqueue that state. We repeat this process until reaching the end of our pattern.

```
function completeGraph (pattern P)
begin
    queue parallelMatches;
    state currentState ⇐s0.move (p₁);
    state temp ⇐null;
    for i ⇐2 until length (p)
        currentState ⇐currentState.move (pᵢ);
        int qlen ⇐parallelMatches.cardinality ( );
        for j ⇐0 until qlen
            temp ⇐parallelMatches.removeLast ( );
            temp ⇐tmp.move (pᵢ);
            if temp ≠ null
            if temp ≠ s0
                parallelMatches.insertFirst (tmp);
                currentState.addEdges (tmp);
                if tmp.isAccepting( )
                    currentState.setAction(...);
                endif
            endif
        endfor
        temp ⇐s0.move(pᵢ);
        if temp ≠ null
        if temp ≠ s0
            currentState.addEdges (tmp);
            parallelMatches.insertFirst (tmp);
        endif
    endfor
end
```

The following function of state, addEdges is called by completeGraph().

```
function addEdges (state destination)
begin
    for i ⇐1 until length (Alphabet)
        state tmp ⇐source.move (aᵢ);
        if tmp ≠ null
        if temp ≠ s0
            addTransition (aᵢ, tmp);
        endif
    endfor
end
```

Note that transitions will be added only if there is a null (non-deterministic FSA) or s0 (deterministic FSA) transition on the given character.

Completed Non-Deterministic FSA

Note that states are generally created in the createGraph function, and these states may be all that are needed. We have now a fully functional FSA with the minimal number of states and transitions. In fact, for a nondeterministic FSA, we may have transitions on only a few of the 128 (or 256) possible elements of our alphabet. Therefore, we may make multiple (two, to be exact) transitions on many inputs. This characteristic is precisely what makes it nondeterministic. A non-determinisitic FSA is capable of quite efficiently matching any number of patterns in parallel using the function, nfaSearch(), or may be converted to a deterministic FSA, as will be shown later. A separate search function, dfaSearch(), makes at most one move per input, as will also be shown later.

Case Insensitivity in Text Searches

In text searches, it is often desirable to make the search case insensitive. We use the following mechanism to attain this end with no loss in efficiency. First, all patterns are converted to lower case before being added to the machine. Then, after running createGraph() and completeGraph() on all patterns, we call makeCaseInsensitive() on machine, which for each state, for each transition on the set of characters a–z, adds a similar transition to the corresponding upper case character.

Running a Non-Deterministic Automaton

By calling nfaSearch() on an input stream, we can match every occurrence of all patterns entered by using the functions above, making, at most, 2 transitions on any given input:

```
nfaSearch (input stream t)
begin
    for i ⇐1 until length(t)
        if currentState ≠ null
            currentState ⇐currentState.move (tᵢ);
            if currentState ≠ null
                if currentState.isAccepting ( ) = true
                    currentState.doAction (...);
                endif
            else
                currentState ⇐s0.move (tᵢ);
            endif
        else
            currentState ⇐s0.move (tᵢ);
        endif
    endfor
end
```

Completing a Deterministic Automaton

If we have followed the steps above, (following the pseudocode specific to creating a deterministic FSA), then all that remains is the following:

```
completeDfa ( )
begin
    for each state s | s ∍S
        for each a | a ∍Σ
            state tmp ⇐s.move(a);
            if tmp = s0
                tmp = s0.move (a);
                if tmp ≠ s0
                    s.addTransition (a, tmp);
                endif
            endif
        endfor
    endfor
end
```

Having built a deterministic FSA, we now have, for each state in our machine, one transition on each member of the alphabet. The number of states remains unchanged, but the total number of transitions changes to the number of states multiplied by the size of the alphabet —128 for purely ascii searches, 256 for searches on all 8 bit entities.

Making a Non-Deterministic FSA Deterministic

To make a machine deterministic, we simply iterate through all states, and for all possible inputs for which a state has no transition, if there is a non-null transition from the initial state on that input, we add that transition to the current state. If not, we add a transition on that input to the initial state:

```
makeDeterministic ( )
begin
    for each state s | s ∋S
        for each a | a ∋Σ
            state tmp ⇐s.move(a);
            if tmp = null
                tmp = s0.move (a);
                if tmp ≠ null
                    s.addTransition (a, tmp);
                else
                    s.addTransition (a, s0);
                endif
            endif
        endfor
    endfor
end
```

Having built a deterministic FSA, we now have, for each state in our machine, transitions on every member of the alphabet. The number of states remains unchanged, but the total number of transitions changes to the number of states multiplied by the size of the alphabet—128 for purely ascii searches, 256 for searches on all 8 bit entities. (If our alphabet were larger, for example 64 kilobytes for 2-byte elements, we would probably use a non-deterministic machine on current hardware.)

We now define a search function for our deterministic FSA. Here is the pseudocode:

```
dfaSearch (input stream t)
begin
    for i ⇐1 until length(t)
        currentState ⇐currentState.move (t_i);
        if currentState.isAccepting ( ) = true
            currentState.doAction (...)
        endif
    endfor
end
```

(Note: currentState will be set to s0 before the first call to dfaSearch().)

The search function for our deterministic machine will make exactly one move for each element in the input stream.

Any pattern used to build a finite automaton using Create-Graph and CompleteGraph will be likely be matched if it occurs in an input stream.

Proof by mathematical induction:

Given a pattern P of length n occurring in input stream I:
1. $p_0$ will be matched, since:
   a. If the current state is s0, by createGraph (P), a transition t ($p_0$, $sp_0$) was placed in s0.
   b. If the current state is s≠s0, by completeGraph (P), s must either have a transition t ($p_0$, $sp_0$), in which case it is matched, or not, in which case the state will become s0 (in a dfa) and the transition from s0 will be made.
2. For any $p_k$|k<n−1, if is $p_k$ is matched, $p_{k+1}$ will be matched, since: By createGraph and completeGraph, the current state, $s_k$, reached by recognition of $p_k$, must have a transition, $t(p_{k+1},s_{k+1})$ which will match $p_{k+1}$.

A Specialized Approach for Smaller Alphabets

For certain applications, the alphabet can be quite small. For example, a DNA molecule can be thought of as a string over an alphabet of four characters {A, T, C, G} (nucleotides). For RNA the characters are {A, C, G, U}. By masking off the 5 high order bits, we get the following:

(In the syntax of C and C++, the "&" operator is used for masking off unwanted bits, in that only the bits that are common to the numbers on either side of the & are looked at. The binary notation for 7 is 00000111).
a & 0x07=1  c & 0x07=3  g & 0x07=7  t & 0x07=4
A & 0x07=1  C & 0x07=3  G & 0x07=7  T & 0x07=4
(For RNA searches): u & 0x07=5
U & 0x07=5

If we use only the three low-order bits, we can now reduce the size of each state's Array to 8, or $\frac{1}{16}^{th}$ the size required for a full ascii search. We then change our move() and addTransition() functions to ignore the 5 high-order bits, and the resulting FSA is much more compact, giving the ability to search for many more patterns in parallel with much less performance degradation due to memory usage. As a side effect, we also get built-in case insensitivity.

```
function move (a_i)
begin
    return Array [a_i & 7];
end
function addTransition (a, s2)
begin
    int index ⇐a & 7;
    ifArray [index]= null
    if Array [index] = s0
        Array [index] ⇐s2;
    endif
end
```

Extending Our Specialized Approach to Full Ascii Searches by Adding a Hash Function A commonly used method of indexing databases is the hash function. A hash function reduces a string of characters to a numeric value.

If we use a machine, such as the one described above, which examines a subset of low orders bits of each input on an alphabet which includes all ascii characters, we will get "false" matches, eg each character in "abcdefghij" has the same 5 low order bits as the corresponding elements of "qrstuvwxyz". (The values are 1, 2, 3, 4, 5, 6, 7, 8, 9, 10, respectively). If, however, we apply a hashing function to the two strings, we get values 306089158 for "abcdefghij", and 1270619813 for "qrstuvwxyz".

Using our hash function, which can be case insensitive if we so desire, we can now derive a numeric value of each of our patterns, and store it in the accepting state for that pattern. When our machine has a match based upon the low-order bits, the hash function is then applied to the characters in the input stream which caused the "partial" match, to determine whether it has an exact match.

This solution has the advantage of smaller arrays, requiring substantially less time to create the FSA, the ability to do case-insensitive searches with no performance hit, and very little decrease in search speed compared to our version using arrays of 128 or 256 elements.

Creating a 3-by-5 Card Prototype Using Our System

Let us begin by building a simple pattern-matching FSA using 3" by 5" note cards. (Paper of any size would do.)

Our goal is to number cards as they are used to create states (we start with 0), and on the cards add whatever transitions are needed. The transitions determine what the next state should be for a given input. If a card represents an accepting state (one which denotes a match) we will place an asterisk followed by the pattern matched.

Creating the Graph

The first step in creating our machine is to define a set of patterns, which we wish to match. We will use the patterns, "free" and "eel", for simplicity. First, we create an initial state (state 0). We add the patterns one by one, adding a transition consisting of the first character of our first pattern followed by the state to which to move. We continue until we have reached the end of the pattern, marking the final state as accepting, with no transitions. After entering the first pattern, we use existing states where appropriate, creating new states only when needed, and marking the final state as accepting for each pattern. The cards are numbered for convenience, by order of creation. The functionality of the machine does not depend on their numbers, but helps us to differentiate them in the diagrams.

The Move Function

Figure 2:
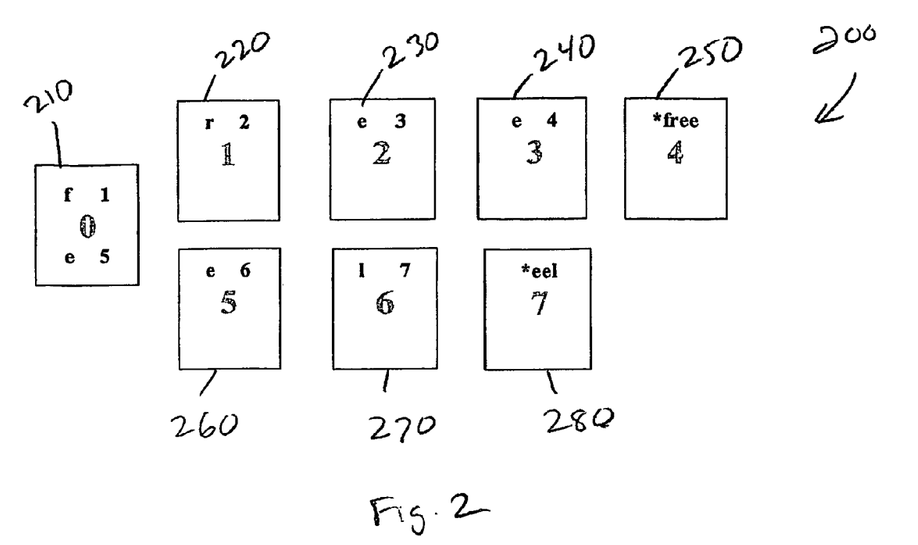
FIG. 2 is partially built FSA.

Referring to FIG. 2, a FSA machine 200 for "free" and "eel" generally comprises states 0–7 (210–280) and functions as follows: Start by placing a coin on state 0 (210), indicating that it is the current state. Then scan a stream of text; and for each character, if there is a transition out of state 0 (210) on that character, move coin to the state indicated by that transition. Continue in this way until reaching the end of the input stream. Whenever there is no transition out of a state on a character, we may make two moves—first we move the coin to state 0 (210) and, if there is a transition out of state 0 (210) on that character, move again.

Clearly, either of patterns will be recognized if they begin with machine in state 0 (210). Consider, however, the input stream, "freel or eeel". It contains two instances of "eel", but neither will be recogized, because the machine will not be in state 0 (210) when the first 'e' of "eel" is encountered. It is now time to apply second method, completing the graph.

Completing the Graph

In the following we will refer to the state moved to on the first character of a string as the "first state" for that string, and the character which caused that move, the "first character". Similarly, at any point, the current state is the ($n^{th}$) state moved to on the current ($n^{th}$) character.

For each pattern we will typically perform the following steps. Start with the initial state and move to the first state for that pattern. Using the transition on the $2^{nd}$ character of our pattern, move to the second state. From this point on, repeat the following through the accepting/final state.

Check the initial state to see if there is a transition on the current character of pattern. If one is found, we place the card representing that transition's state next to the current state card. We then copy all transitions from that state to our current state, excepting any transitions on our current character. In addition, if that state is an accepting state, we add that information to our current state.

If we have placed state cards next to our previous state card, check to see if there is a transition on our current character out of that state. If there is, place the state card for that transition next to our current state card, and copy all transitions from that state to our current state, excepting any transition on our current character, copying our accepting state information, if any, as well. Move to the next state, using the transition on the next character.

For our example machine, we apply the technique above as follows:

For our first-pattern, "free", we move according to the transition, 'f' 1, from state 0 to state 1. We then move to state 2, on 'r'. Then we check the initial state to see if there is a transition on our current character, 'r'. There is none. We now make the transition on 'e' to state 3. We check state 0 for a transition on 'e'. There is one, to state 5. We place the state 5 card next to our current state (3) card, and cannot copy the transition "e, 6", since we already have a transition on 'e'. We then move to state 4 on 'e', and move on 'e' from the previously placed state 5 card to state 6, place the state 6 card next to our current state, copying the 'i' 7 transition to our current state. Looking again at state 0, we find the transition on 'e', copying the transition from the state 5 card.

Figure 3:
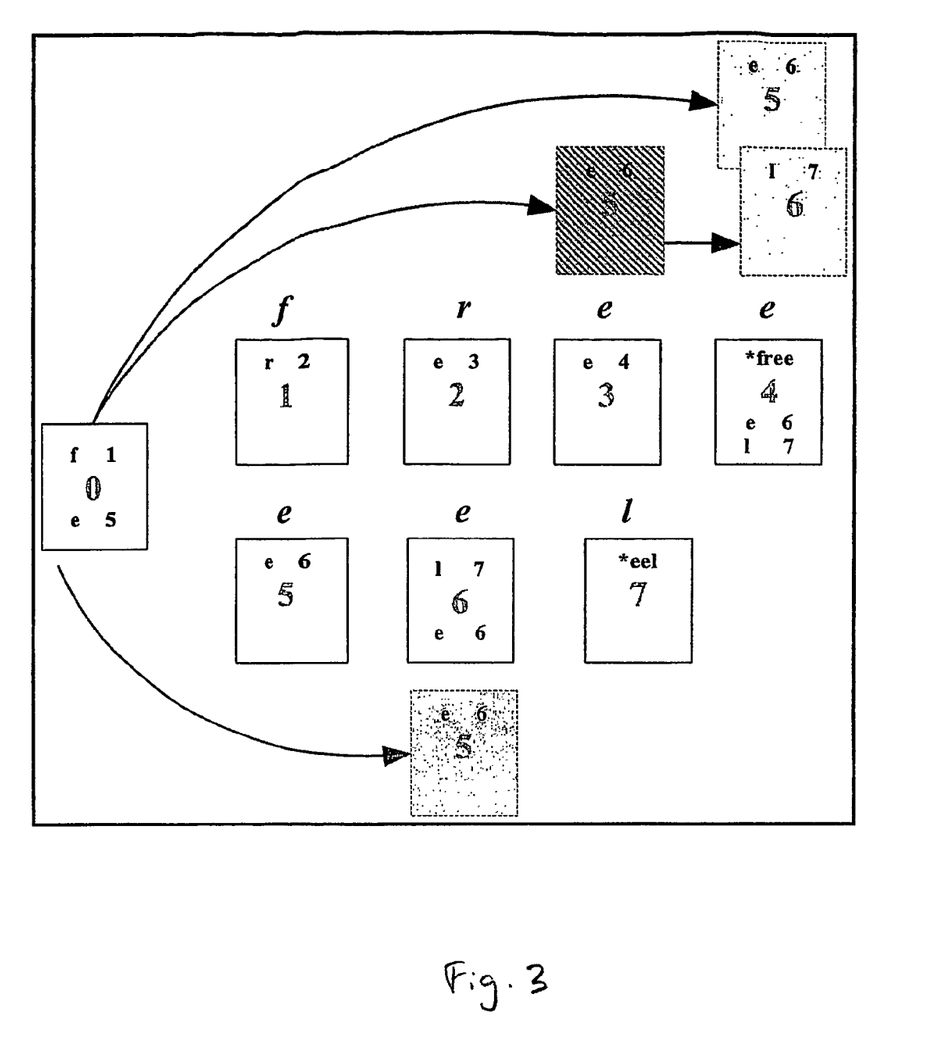
FIG. 3 is diagram demonstrating steps of the FSA.

We follow the same procedure for our second pattern, "eel". FIG. 3 demonstrates the steps we have just described.

Figure 4:
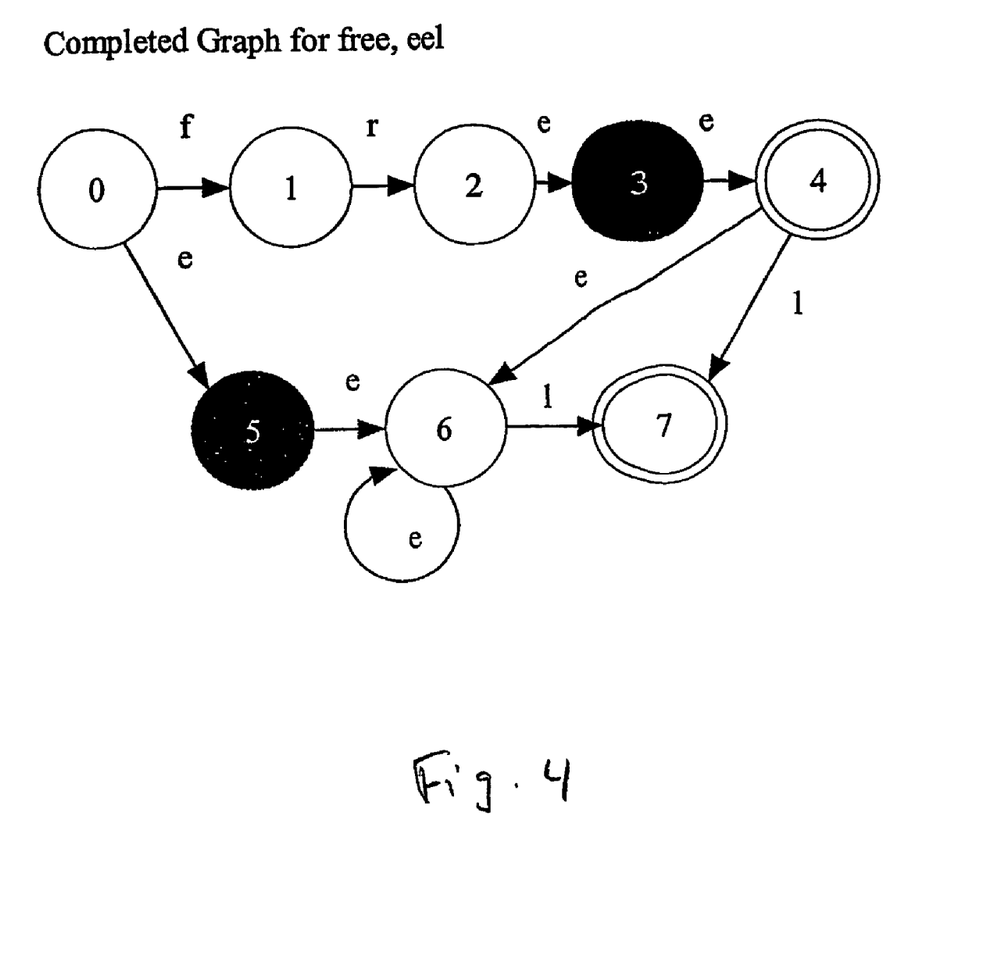
FIG. 4 is a state transition diagram for a completed FSA.

After having repeated the above procedure on the two patterns, "free", and "eel", we now have a machine which how has 10 transitions or edges, as opposed to the original 7, and is capable of matching each of our patterns, no matter where they occur in any input stream, including overlapping patterns. FIG. 4 is a state transition diagram for our completed FSA for "free", and "eel".

State Transition Diagram for Completed FSA

Our prototype is, by nature object-oriented, i.e. each state is represented in such a way as to encapsulate the data (transitions) which define where to move on a given input. We will now describe, using an object-oriented form of pseudocode, how we implement our method to create a software version of our machine.

Thus, specific embodiments and applications of an object approach to parallel pattern matching have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A deterministic finite state automaton (FSA), responsive to an n-symbol alphabet, adapted to match, in parallel, m patterns each comprised of sequentially ordered symbols selected from said alphabet, the FSA comprising:

an initial state adapted to store therein n nextState transitions, each transition being responsive to a respective one of said symbols in said alphabet;

a plurality of states, each corresponding to one symbol contained at a given position in one or more of said m patterns, and being adapted to store therein n nextState transitions, each transition being responsive to a respective one of said symbols in said alphabet;

wherein:

said initial state has stored therein a plurality of transitions each to a first state responsive to a first symbol of one or more of said m patterns;

each state which corresponds to position i in one or more of said m patterns having stored therein j transitions to the j next sequential states each responsive to a particular symbol at position i+1 in one or more of said m patterns, such that each of said m patterns is associated with one unique sequential set of successive transitions from the initial state;

if, after s sequential symbols in any one A of said m patterns, a sequence of no more than t sequential symbols corresponds to the first t symbols of a pattern B from amongst said m patterns, where t is at least one but less than the number of symbols in pattern B, then the (s+t) state of said unique sequential set associated with pattern A of successive transitions from the initial state also has stored therein a transition to the (t+1) state of said unique sequential set associated with pattern B of successive transitions from the initial state.

2. The FSA of claim 1 wherein all transitions stored in each of said states, other than the transitions detailed in claim 1, comprise transitions to said initial state, each responsive to a respective one of said symbols of said alphabet.

3. The FSA of claim 1 wherein:
each final state reached by each unique sequential set of successive transitions from the initial state associated with each of the m patterns has stored therein an action to be performed upon transition to said final state.

4. A method of using the FSA of claim 3, the method comprising the steps of:
receiving an input stream of symbols, at least some of which are selected from said alphabet;
presenting to said FSA each of said received symbols; and
when a sequence of symbols in said input stream is found by said FSA to match one of the said m patterns, performing said action.

5. A method for creating the deterministic finite state automaton (FSA) of claim 2, the method comprising the steps of:
(1) creating a partial graph by:
(1.1) creating an initial state, and storing therein n nextState transitions to said initial state, each responsive to a respective one of said symbols in said alphabet;
(1.2) selecting said first pattern;
(1.3) for said selected pattern:
(1.3.1) selecting as a current state said initial state;
(1.3.2) selecting a first symbol in said selected pattern;
(1.3.3) selecting as a next state the nextState transition stored in said selected current state which is responsive to the selected symbol;
(1.3.4) if said next state is said initial state:
(1.3.4.1) creating a next state, and storing therein n nextState transitions to said initial state, each responsive to a respective one of said symbols in said alphabet; and
(1.3.4.2) storing in said selected current state a transition to said next state responsive to said selected symbol;
(1.3.5) selecting as said current state said selected next state;
(1.3.6) if said selected pattern comprises at least one additional symbol, selecting a next successive symbol in said selected pattern and returning to step (1.3.3); and
(1.3.7) if said selected pattern comprises said first pattern, selecting said second pattern and returning to step (1.3.1); and (2) completing said partial graph by:
(2.1) selecting said first pattern;
(2.2) for said selected pattern:
(2.2.1) selecting a first symbol in said selected pattern;
(2.2.2) selecting as said current state the nextState transition stored in said initial state which is responsive to the selected symbol;
(2.2.3) if said selected pattern comprises at least one additional symbol:
(2.2.3.1) selecting a next successive symbol in said selected pattern;
(2.2.3.2) selecting as said current state the nextState transition stored in said selected current state which is responsive to the selected symbol;
(2.2.3.3) if a first-in-first-out queue has q states enqueued therein, where q is at least one:
(2.2.3.3.1) removing from said queue the first state enqueued therein;
(2.2.3.3.2) selecting as a temporary state said state removed from said queue;
(2.2.3.3.3) selecting as said temporary state the nextState transition stored in the temporary state selected in step (2.2.3.3.2) which is responsive to the selected symbol;
(2.2.3.3.4) if said selected temporary state is not said initial state:
(2.2.3.3.4.1) for each nextState transition in the selected current state which corresponds to the initial state, storing in said selected current state the corresponding nextState transition stored in said selected temporary state;
(2.2.3.3.4.2) enqueueing on said queue the selected temporary state; and
(2.2.3.3.4.3) if said queue has at least one of said q states enqueued therein, returning to step (2.2.3.3.1);
(2.2.3.4) selecting as said temporary state the nextState transition stored in said initial state which is responsive to the selected symbol;
(2.2.3.5) if said selected temporary state is not said initial state:
(2.2.3.5.1) enqueueing on said queue said selected temporary state; and
(2.2.3.5.2) for each nextState transition in the selected current state which corresponds to the initial state, storing in said selected current state the corresponding nextState transition stored in said selected temporary state;
(2.2.3.6) if said selected pattern comprises at least one additional symbol, selecting a next successive symbol in said selected pattern and returning to step (2.2.3.1); and
(2.3) if said selected pattern comprises said first pattern, selecting said second pattern and returning to step (2.2).

6. The method of claim 5 wherein each of said states comprises an array of n elements, each element adapted to store a transition responsive to a respective one of said n symbols.

7. The method of claim 5:
wherein each of said states is adapted to store an action to be performed upon transition to said state; and
wherein said step (1.3.5) is further characterized as:
(1.3.5a) selecting as said current state said selected next state; and
(1.3.5b) storing into said selected current state a predetermined action associated with said selected pattern.

8. The method of claim 7 wherein each of said states comprises:
   an array of n elements, each element adapted to store a transition responsive to a respective one of said n symbols; and
   an action associated with said state.

9. The method of claim 8 wherein each state having an action associated therewith is adapted to perform said action in response to transition thereto during a match operation.

10. The method of claim 7:
   wherein said step (2.2.3.5.2) is further characterized as:
      (2.2.3.5.2a) for each nextState transition in the selected current state which corresponds to the initial state, storing in said selected current state the corresponding nextState transition stored in said selected temporary state; and
      (2.2.3.5.2b) storing into said selected current state said predetermined action associated with said selected pattern.

11. The method of claim 10 wherein each of said states comprises:
   an array of n elements, each element adapted to store a transition responsive to a respective one of said n symbols; and
   an action associated with said state.

12. The method of claim 11 wherein each state having an action associated therewith is adapted to perform said action in response to transition thereto during a match operation.

\* \* \* \* \*